United States Patent [19]

Kurogama et al.

[11] Patent Number: 4,954,702

[45] Date of Patent: Sep. 4, 1990

[54] PROCESS FOR DETECTING A FOCAL POINT IN AN OPTICAL HEAD

[75] Inventors: Tatsuji Kurogama; Masanori Kawai, both of Hachioji; Koji Matsushima, Akishima; Mitsuru Watanabe, Hachioji, all of Japan

[73] Assignee: Konica Corporation, Tokyo, Japan

[21] Appl. No.: 257,367

[22] Filed: Oct. 13, 1988

[30] Foreign Application Priority Data

Oct. 14, 1987 [JP] Japan .................................. 62-259233
Nov. 30, 1987 [JP] Japan .................................. 62-304110
May 31, 1988 [JP] Japan .................................. 63-134690

[51] Int. Cl.$^5$ .............................................. G01J 1/20
[52] U.S. Cl. ................................... 250/201.2; 369/45
[58] Field of Search .................. 250/201; 369/44–46, 369/112

[56] References Cited

U.S. PATENT DOCUMENTS

| | | | |
|---|---|---|---|
| 4,482,803 | 11/1984 | Lacotte et al. | 369/45 |
| 4,716,283 | 12/1987 | Ando | 369/45 |
| 4,778,984 | 10/1988 | Nakamura | 369/45 |

Primary Examiner—David C. Nelms
Assistant Examiner—Khaled Shami
Attorney, Agent, or Firm—Finnegan, Henderson, Farabow, Garrett and Dunner

[57] ABSTRACT

A method for detecting a focal point uses an optical system which includes a laser diode light source, a beam-splitter prism having three surfaces with one surface perpendicular to luminous flux emanating from a recording medium and another surface inclined relative to the first, an objective lens between the prism and the recording medium, a photodetector, and an apparatus capable of moving the objective lens perpendicular to the recording surface. The method using this apparatus includes the steps of placing the prism so that the incident angle of the flux through the objective lens is less than the emergent angle of the flux from the prism to the photodetector, detecting the intensity of the light, and driving the objective lens in response to an electrical signal.

34 Claims, 16 Drawing Sheets

FIG. 12
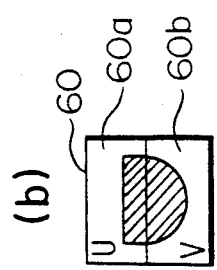
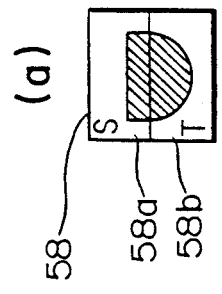
FIG. 14
FIG. 13
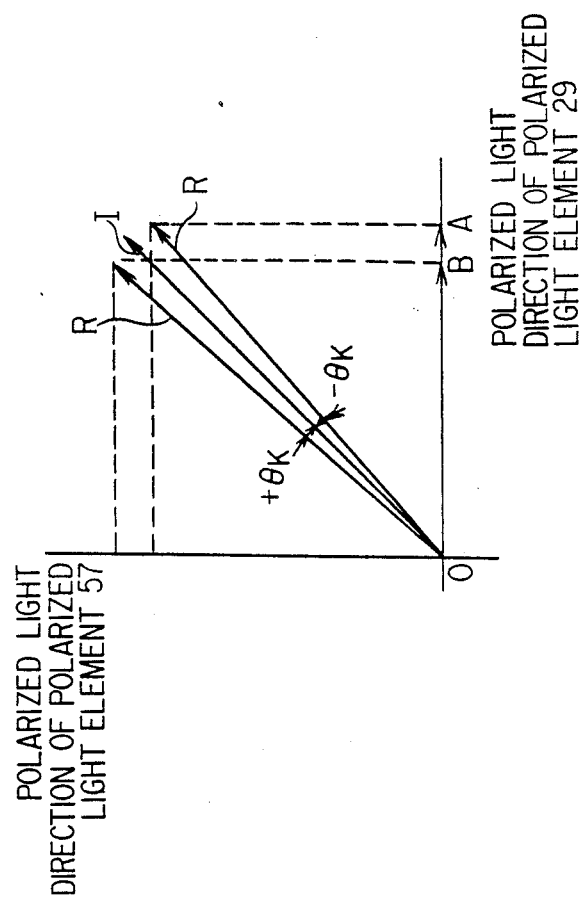

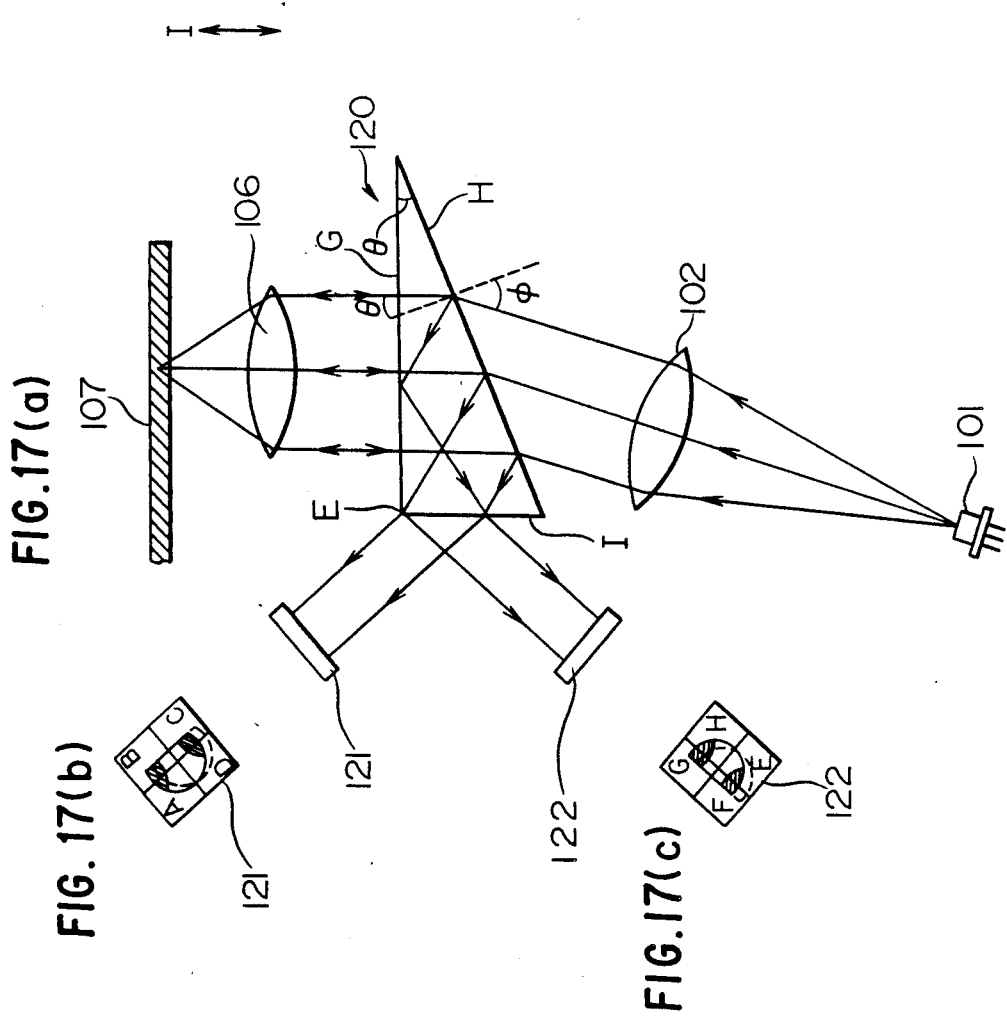

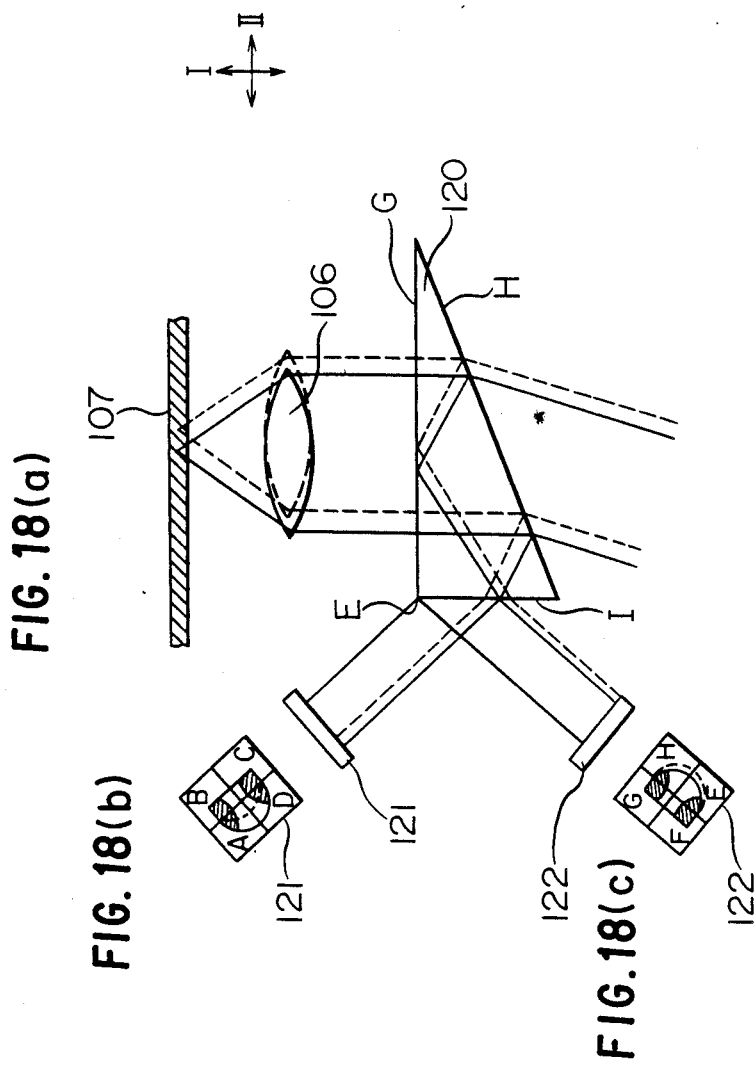

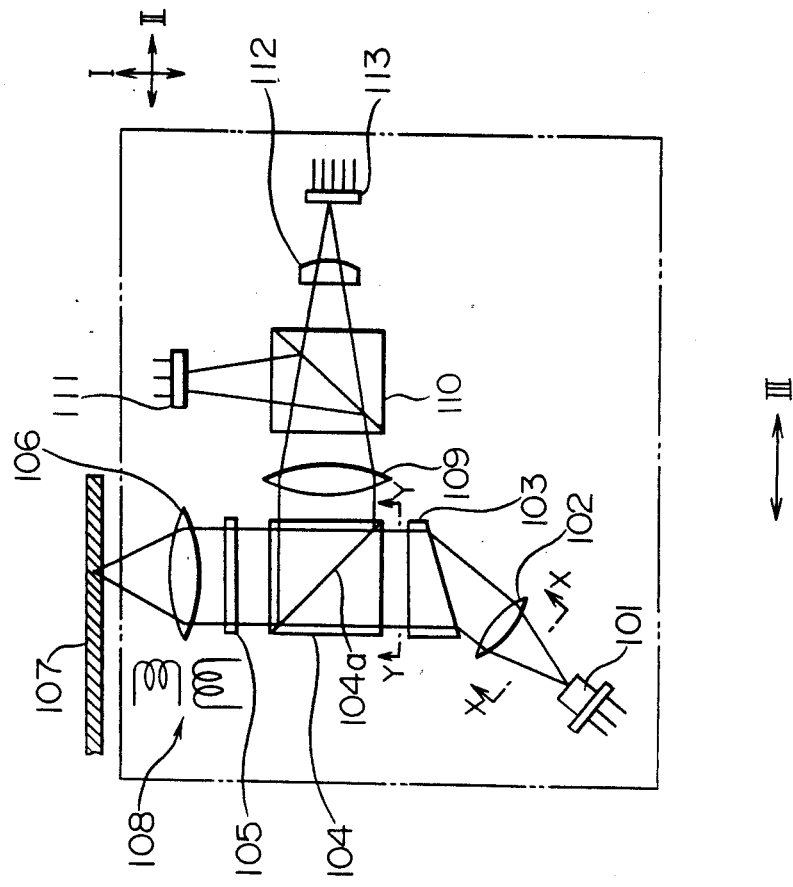
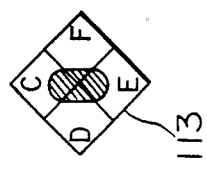
FIG. 19(a)
FIG. 19(b)
FIG. 19(c)

PROCESS FOR DETECTING A FOCAL POINT IN AN OPTICAL HEAD

FIELD OF THE INVENTION

The present invention relates to a process for detecting a focal point in an optical head used on an optical disk apparatus for a compact disk, laser disk, image file, document file, and the like.

BACKGROUND OF THE INVENTION

Next, using drawings, prior art is hereunder described. FIG. 7 illustrates one example of an afocal system on a conventional optical head. FIG. 8 schematically illustrates one example of a photodetector in FIG. 7. FIG. 9 schematically illustrates another example of a photodetector in FIG. 7. FIG. 10 schematically illustrates one example of a focal system on a conventional optical head.

First, using FIG. 7, and example of an afocal system on a conventional optical head is hereunder described. In this figure, numeral 1 represents a laser diode that serves as a light source; 2, collimator lens that converts the beam from the laser diode 1 into a parallel beam; 3, beam splitter that has an optical splitting surface 3a for separating the incident beam into two independent beams; 4, objective lens that shifts in the arrow I direction during a focusing operation, and travels in the vertical direction relative to the plane of this figure, during a tracking operation, and that focuses the parallel beam from the beam splitter 3 onto a recording medium 5; 6, photodetector disposed on the side face of the beam splitter 3. In moving to the reading position, the optical head as one entity moves in the vertical direction relative to the plane of this figure.

According to such a constitution, the beam emitted from the laser diode 1 is directed to the recording medium 5 surface via the collimator lens 2, beam splitter 3, and objective lens 4. The beam reflected from the recording medium 5 is separated by the optical splitting surface 3a of the beam splitter 3, and one independent beam is emitted substantially vertically relative to the optical splitting surface 3b and is directed to the photodetector 6. As shown in this figure, when the recording medium 5 is in position (1) (indicated by a solid line), the optimum focal relation is present between the recording medium 5 and the objective lens 4, wherein the fed-back beam is indicated by thin lines. When the recording medium 5 is in position (2) (indicated by a two dot chain line), the recording medium is too near to the objective lens 4, wherein the fed-back beam is indicated by dashed lines. When the recording medium 5 is in position (3) (indicated by a two dot chain line), the recording medium is too far from the objective lens 4, wherein the fed-back beam is indicated by alternate long and short dashed lines.

Next, based on FIG. 8, the photodetector 6 is hereunder described. According to this figure, the photodector 6 has two concentric optical splitting surfaces 6a and 6b. Numeral 7 represents a differential amplifier that, when fed with outputs A and B from the respective optical splitting surfaces 6a and 6b, performs arithmetical operation "A−B". As can be understood from this figure, the focal status of the objective lens 4 varies the diameter of the beam directed to the photodetector 6. Accordingly, the output level "A−B" on the differential amplifier 7 correspondingly varies, thereby the output level is used as a focal point detecting signal (focusing error signal).

Next, another example of a photodetector is described using FIG. 9. In this figure, numeral 8 represents a photodetector that has three optical splitting surfaces 8a, 8b, and 8c. Numeral 9 represents a differential amplifier that is fed with the outputs A, B, and C, correspondingly of respective optical splitting surfaces 8a, 8b, and 8c, and that performs an arithmetic operation "(A+C)−B". According to this example too, in a manner identical with the preceding example, the diameter of the beam directed to the photodetector 8 varies depending on the focal status of an objective lens 4. Correspondingly, the output level "(A+C)−B" of the differential amplifier 9 varies, and is used as a focusing error signal. Incidentally, the focal point detecting technique (focus error detecting technique) shown in FIGS. 8 and 9 is known as a beam size technique.

Based on FIG. 10, one example of an afocal system on a conventional optical head is hereunder described.

In this figure, numeral 11 represents a laser diode that serves as a light source; 12, beam splitter than has an optical splitting surface 12a for separating the incident beam into two independent beams; 13, objective lens that shifts to the arrow I direction during a focusing operation, and travels to the vertical direction relative to the this figure, during a tracking operation, and that focuses the non-parallel beam from the beam splitter 12 onto a recording medium 14; 15, photodetector disposed on the side face of the beam splitter 12. In moving to the reading position, the optical head as one entity moves to the vertical direction relative to this figure.

According to such a constitution, the beam emitted from the laser diode 11 is directed to the recording medium 14 surface via the beam splitter 12 and objective lens 13. The beam reflected from the recording medium 14 is separated by the optical splitting surface 12a of the beam splitter 12, and one independent beam is emitted from an optical splitting surface 12b and is directed to the photodetector 15. As shown in this figure, when the recording medium 14 is in position (1) (indicated by a solid line), the optimum focal relation is present between the recording medium 14 and the objective lens 13, wherein the fed-back beam is indicated by thin lines. When the recording medium 14 is in position (2) (indicated by a two dot chain line), the recording medium is too near to the objective lens 13, wherein the fed-back beam is indicated by dashed lines. When the recording medium 14 is in position (3) (indicated by a two dot chain line), the recording medium is too far from the objective lens 4, wherein the fed-beck beam is indicated by alternate long and short dashed lines.

The focal point detecting technique used in conjunction with the photodetector 15 is a beam size technique the same as that of the optical head on the afocal optical system mentioned previously, and the description of which is omitted.

According to the so-constituted prior art examples, the beam size technique is advantageous in that as compared with other focal point detecting techniques (such as an astigmatism technique, knife-edge technique, critical angle technique, and Foucault technique), this technique entails simple constitution, and fewer parts number, and lower manufacturing cost. Being so simply constituted, and having fewer parts, an optical head based on this technique is light and compact, and that allows high speed accessing. This technique, however, incurs low focal sensitivity.

At the same time, since not requiring a collimator lens, an optical head on the focal system such as in FIG. 10 is simply constituted, having fewer parts, and lower manufacturing cost, as compared with the optical head of the afocal system such as that shown in FIG. 7. Additionally, being so simply constituted, and having fewer parts, an optical head based on this focal system is light and compact, and that allows high speed accessing. This technique, however, incurs a problem that since light emitted from a laser diode 11 travels in the form of divergent light through a beam splitter 12 an aberration is produced, and satisfactorily converging the laser beam on the recording medium 14 is difficult. Another problem is that with a focal optical system, adjusting respective optical elements is difficult.

SUMMARY OF THE INVENTION

The present invention is intended to solve the above-mentioned problems, and, therefore, an object of the invention is to provide an optical head whose optical elements are readily adjusted, wherein the optical head has higher focus detecting sensitivity. Another object of the invention is to provide a low-cost, compact, lightweight, optical head capable of readily decreasing access time.

With the optical head of the invention that solves the problems above, a beam emitted from a light source is directed onto a recording medium, and the beam reflected from or transmitted via the recording medium is fed into a beam splitter via an objective lens, thereby the beam splitters separates the beam into differently oriented independent beams, and the so-separated beams are independently fed into corresponding photodetecting means, in order to allow, at least, a focusing operation. And, the incident angle according to which the reflected or transmitted beam comes onto the incident surface via the objective lens is smaller than the exit angle of the beam from the exit surface of the beam splitter.

The details of the present invention can be summarized as follows.

A method for detecting a focal point by the use of an optical system comprising, (a) a light source for emitting a luminous flux to irradiate a recording medium;

(b) a prism;

(c) an objective lens provided between said prism and said recording medium;

(d) a photodetector for detecting luminous intensity of the light flux from said recording medium through said objective lens and said prism, and converting luminous intensity to electric signals; and (e) a lens driving means attached to said objective lens and capable of moving said objective lens in the direction perpendicular to the surface of said recording medium corresponding to said electric recording from said photodetector;

said method comprising the steps of:

placing said prism so that the incident angle thereto of said luminous flux from said recording medium through said objective lens is smaller than the emergent angle of said flux from said prism to said photodetector;

detecting said luminous intensity of the flux emerged from said prism by said photodetector to convert into electric signals; and operating said lens driving means to adjust the distance between said recording medium and said objective lens.

FIG. 2 illustrates the principle of the present invention. Numeral 17 represents a lens to which luminous flux comes from a detected object. Numeral 18 represents a prism to which luminous flux comes from the lens 17. Numeral 19 represents a photodetector which can keep the lens 17 in focus with luminous flux guided through the prism 18.

When the lens 17 is kept in focus to the detected object, luminous flux which proceeds from the lens 17 to the prism 18 becomes almost parallel. The prism 18 is set so as to the incident angle u to the prism surface 18 is smaller than the emergent angle y to the prism surface 18.

With the optical head of the invention, a beam emitted from a light source is directed onto a recording medium. The beam reflected from or transmitted through the recording medium is directed to a beam splitter via an objective lens, thereby the beam splitter separates the beam into two independent beams of different direction. The independent beams are directed to different corresponding photodetecting means. In this course, the incident angle of the beam from the objective lens onto the beam splitter incident surface is smaller than the exit angle of the beam from the beam splitter exit surface.

BRIEF DESCRIPTION OF THE DRAWINGS

FIG. 12 illustrates light receiving element used in the system in FIG. 11;

FIG. 13 describes the principle of optomagnetic recording operation performed in the system in FIG. 11;

FIG. 14 illustrates transmittances of the S-polarized light component and R-polarized light component in the system in FIG. 11;

FIGS. 17a, 17b, and 17c schematically illustrates another preferred embodiment of the invention;

FIGS. 18a, 18b, and 18c schematically illustrate the operation of the system in FIG. 17;

FIGS. 19a, 19b, and 19c illustrate a prior art example;

DETAILED DESCRIPTION OF THE PREFERRED EMBODIMENT

Figures 1A, 1B, 1C:
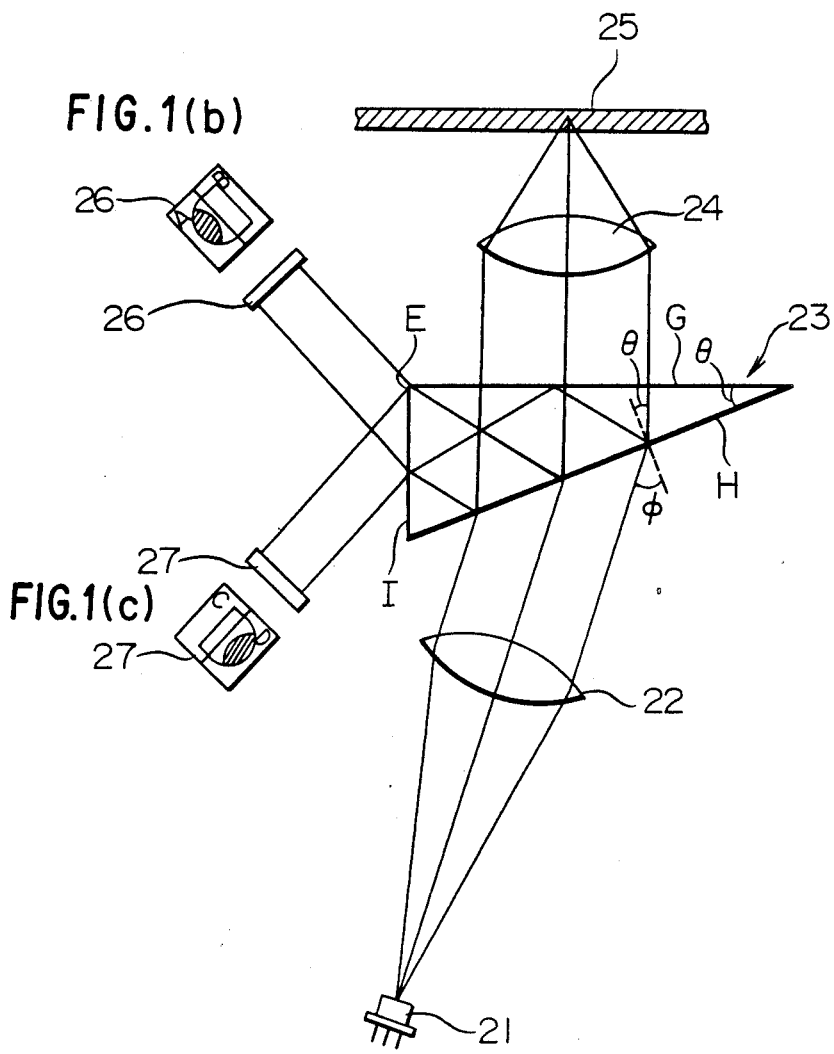
FIGS. 1a, 1b, and 1c schematically illustrate the first preferred embodiment according to the invention.
Figure 2:
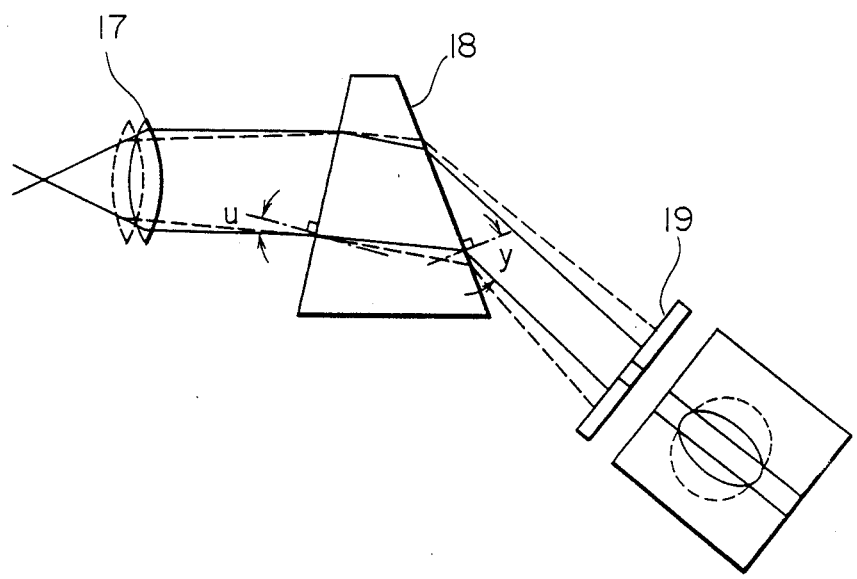
FIG. 2 illustrates the principle of the invention

The first preferred embodiment of the invention is hereunder described referring to FIGS. 1 through 5.

In FIG. 1, numeral 21 represents a laser diode serving as a light source; and 22, collimator lens that converts the beam from the laser diode 21 into a parallel beam.

Numeral 23 represents a prism-configured beam splitter having apex angle θ; 24, objective lens that converges and focuses the beam from the laser diode 21 onto a recording medium 25; 26 and 27, first and second two split photodetectors disposed to the side of a surface I (whose detail given later) of the beam splitter 23.

The beam splitter 23 has a surface G that faces the objective lens 24 and is perpendicular to the axis of the objective lens 24; surface H that faces the collimator lens 22 and slopes to the surface G; and surface I that is perpendicular to the surface G and connects the surface G and surface H. The beam splitter 23 is disposed so that the axis of the beam reflected from the surface H is aligned with edge line E between the surface G and surface H. Additionally, the laser diode 21 is disposed and the refractive index n of the beam splitter 21 is accordingly selected so that the laser beam from the collimator lens 22 forms, relative to the surface H, an incident angle of θ, and refraction angle of θ.

Numerals 26 and 27 represent first and second two split photodetectors to which the differently oriented, so-separated beams are correspondingly directed. The incident surface G of the beam splitter 23 is disposed so that it becomes virtually perpendicular to the incident beam (incident angle≈0°) once the object lens 24 attains optimum focal status, and that the exit beam slopes to the exit surface I of the beam splitter 23 (exit angle >>0°), thereby the incident angle is smaller than the exit angle.

Next, the operation based on the above-mentioned constitution lens 22 comes onto the surface H of the beam splitter 23 with the incident angle of θ, thereby the diameter of the beam is enlarged cos θ/cos φ times along a radius of the recording medium 25, and the ellipticity of the beam is thus improved. The beam exists from the surface G virtually vertically, and is converged by the objective lens 24 and is focused onto the recording medium 25. The beam reflected from the recording medium 25 is modified to a parallel beam by the objective lens 24, and enters the surface G virtually perpendicularly and is reflected by the surface H. the axis of the reflected beam is aligned with the edge line E between the surface G and surface I, thereby the beam is separated at the axis into two independent beams, wherein one independent beam is reflected by the surface G and travels through the surface I, exits opposite to the recording medium, and is directed onto the two split photodetector 27. At the same time, the other independent beam travels through the surface I and exits toward the recording medium 25, and is directed onto the two split photodetector 26.

One example of a beam spot formed on the two split photodetector 26 is given by FIG. 1(b), and one example of a beam spot on the two split photodetector 27 is given by FIG. 1(c). Those highlighted by oblique lines in (b) and (c) are fist diffraction light areas based on pits or grooves on the recording medium 25. Based on outputs A through D that correspond with optical splitting surfaces on the photodetectors 26 and 27, a tracking error signal, and focusing error signal are defined as follows.

Tracking error signal: (A+B)−(C+D)
Focusing error signal: (A+D)−(C+B).

Figure 3:
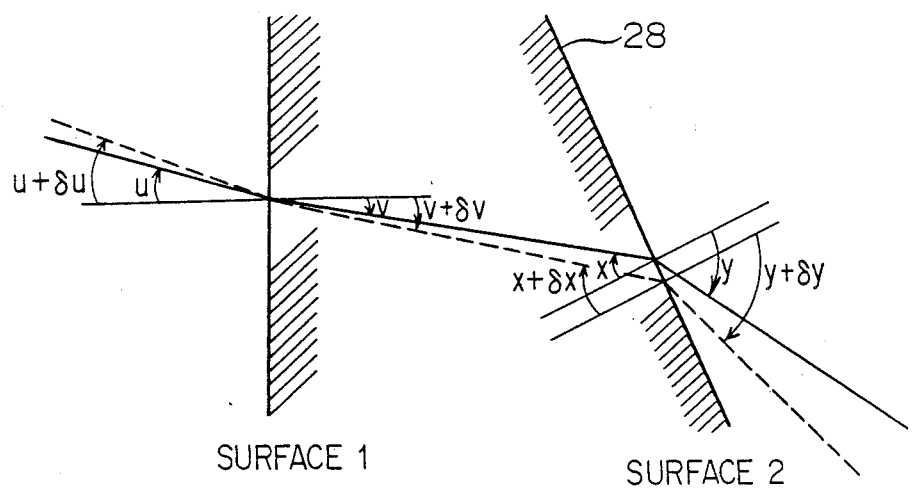
FIG. 3 illustrates the operation of the beam splitter of FIG. 1.

Next, FIG. 3 is a drawing that describes the correlation of the incident angle of a beam relative to the incident surface (surface 1) of a conventional beam splitter 28 versus the exit angle of the beam from the exit surface (surface 2). The drawing describes two beam paths; one (shown by a solid line) where the beam enters the beam splitter 28 at a particular angle u ($0 \leq u < \pi/2$) relative to the normal line of the incident surface (surface 1); and the other (shown by a dashed line) where the path is deviated, by angle δu, from the above angle.

Figure 4:
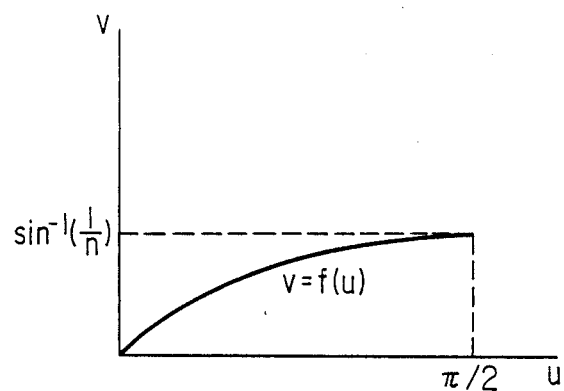
FIGS. 4 and 5 described $V=f(u)$.

As shown in this figure, when
incident angle on surface 1=u
refraction angle on surface 1=v
incident angle on surface 1=x
refraction angle on surface 1=y
and if u changes as follows;
$$u \rightarrow u + \delta u$$

then the other angles change as follows:
$$v \rightarrow v + \delta v$$
$$x \rightarrow x + \delta x$$
$$y \rightarrow y + \delta y$$

and suppose that the beam splitter 28 is in air, and that the refractive index of the beam splitter relative to air is n (n>1);
then according to the Snell's law;

$$\sin u = n \sin v \quad (0 \leq u < \pi/2) \tag{1}$$

$$\sin y = n \sin x \quad (0 \leq y < \pi/2) \tag{2}$$

if $u < y$;

$$v < x \tag{3}$$

then;

$$x = v + \alpha \quad (\alpha > 0) \tag{4}$$

based on expression (1);

$$V = \sin^{-1}\{(\sin u)/n_2\} \tag{5}$$

$$dv/du = \cos u \sqrt{n^2 - \sin^2 u} > 0 \tag{6}$$

$$d^2v/du^2 = A/B > 0 \tag{7}$$

wherein; $A = \sin u \cdot (1 - n^2)\frac{3}{2}$ $B = (n^2 - \sin^2 u)$ $$f(u) = \sin^{-1}(\sin u/n) \tag{8}$$

whereby when v=f(u) is graphically plotted, the result is, as can be expected from expressions (6) and (7), a monotonous rising graph as shown in FIG. 4.

The tendency as evidenced by expressions (5) through (8) is also applicable to x and y, where x corresponds with v, and y with u.

Figure 5:
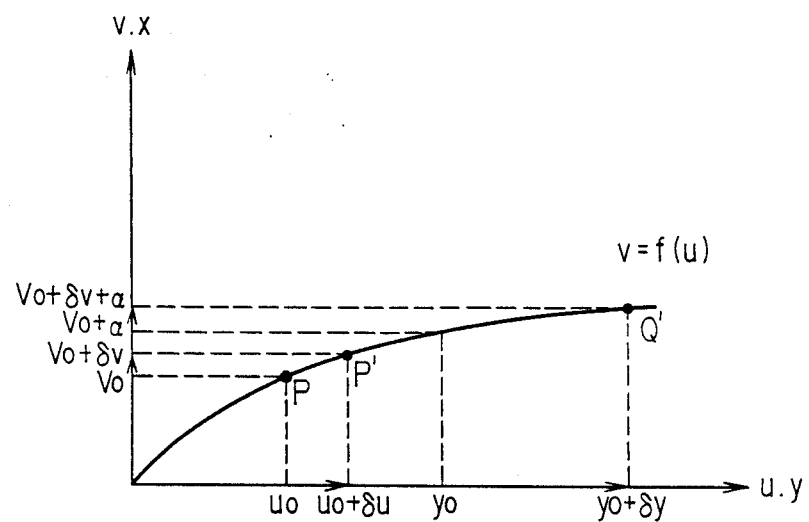

Now, suppose that the incident angle on the surface 1 varies from $u=u_0$ to $u=u_0+\delta u$. In this case, the incident angle u on the surface 1 and the resultant refraction angle v are defined as point $P(u_0, v_0)$ on $v=f(u)$, as shown in FIG. 5. If u varies to $u_0+\delta u$, the new point on $v=f(u)$ will be $P'(u_0+\delta u, v_0+\delta v)$.

The incident angle X of a beam onto the surface 2 and the resultant refraction angle y of the beam, wherein the beam has entered the surface 1 at the incident angle of $u=u_0$, can be expressed as point $Q(y_0, v_0+\delta)$ on $v=f(u)$ and this point satisfies $v=x_0$ and $v=v_0+\alpha$ $(\alpha>0)$. When u varies, the variation similar to that of vertical variation $(=\delta v)$ of the point P to P' occurs to point Q. When the new point is assumed to be Q', the point Q' can be expressed as $(y_0+\delta y, v_0+\delta v+\alpha)$.

To sum up, the relation $\delta u > \delta y$ is valid.

Therefore, according to the focus detecting technique in FIG. 1, by using a beam splitter 23 that ensures "incident angle u on surface G" < exit angle y on surface I", the irregularity $\delta u$ is positively smaller than $\delta y$ as compared with a case that lacks a prism. In other words, a larger deviation is ensured, thereby the resulting focusing sensitivity is greater.

According to such a constitution, the prism shaped beam splitter 23 serves not only as a shaped prism but also as a beam splitter that splits a beam directed onto a recording medium 25, thereby the resultant optical head is compact and light-weight, and an access time is positively decreased. A smaller number of parts allows a smaller number of steps in assembling process, hence a lower manufacturing cost. Furthermore, the beam splitter 23 separates the fed-back beam into two independent beams, one toward the recording medium 25, and the other opposite to the recording medium 25. Therefore, a resultant photodetection system can eliminate an optical element (such as a half mirror) that separates a beam into one for tracking error detection and the other for focus error detection.

Figure 6:
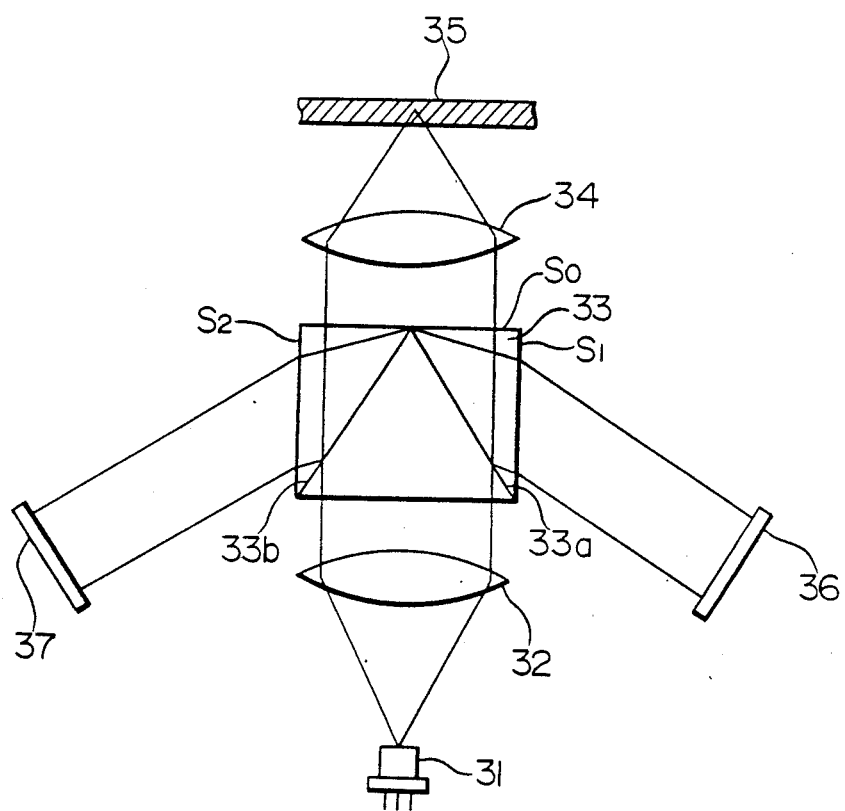
FIG. 6 schematically illustrates the second preferred embodiment according to the invention.
Figure 7:
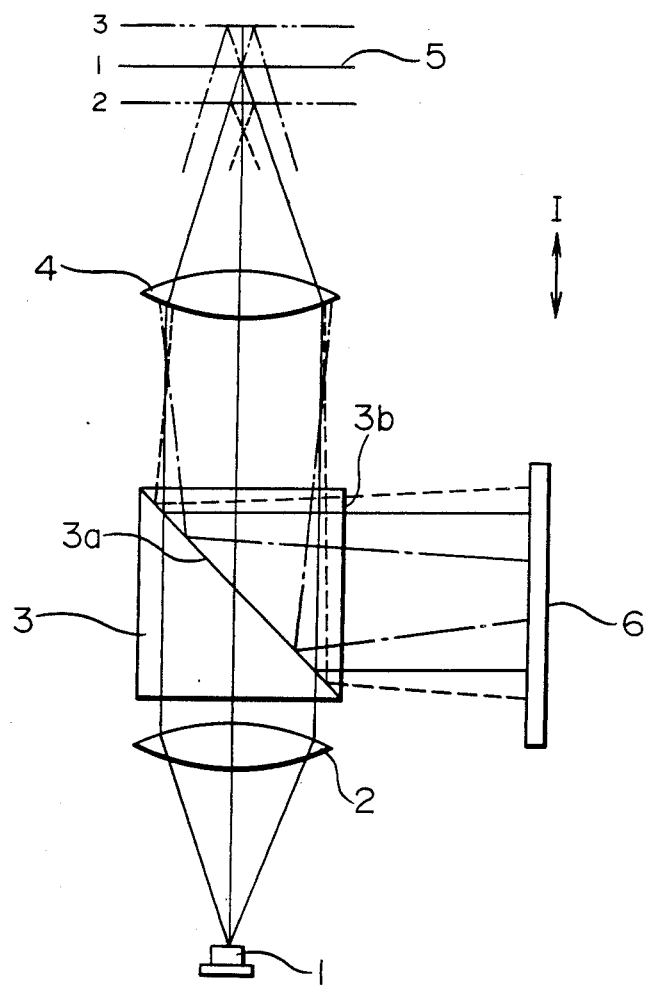
FIG. 7 illustrates one example of an afocal system on a conventional optical head.
Figure 8:
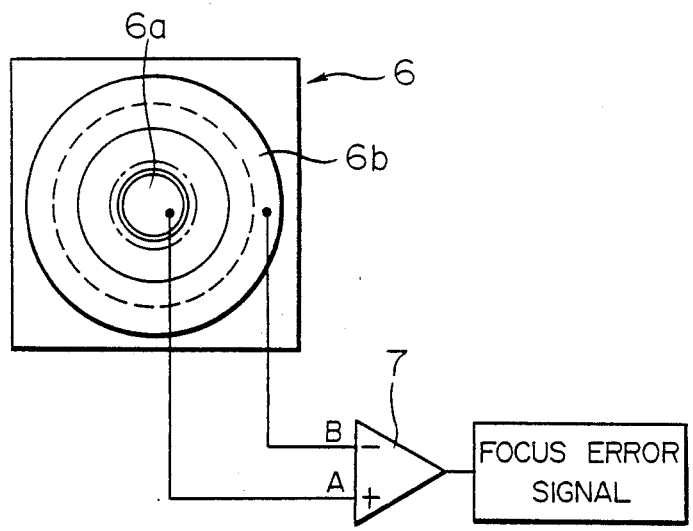
FIG. 8 schematically illustrates one example of a photodetector in in the system of FIG. 7.
Figure 9:
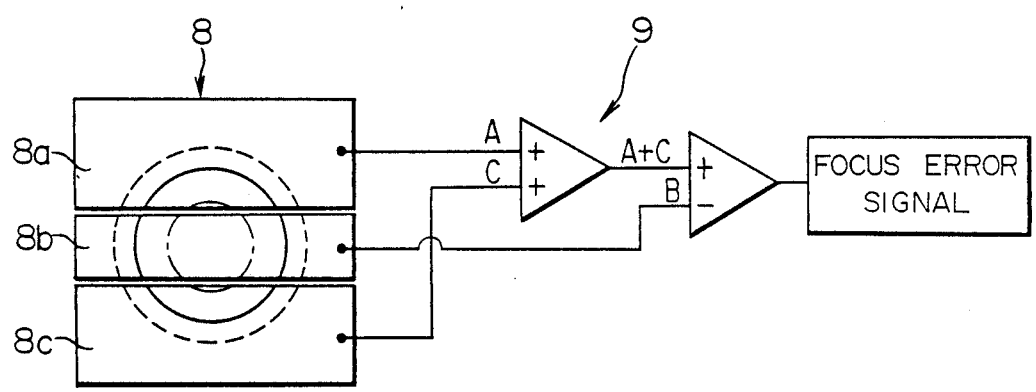
FIG. 9 schematically illustrates another example of a photodetector in the system of FIG. 7.
Figure 10:
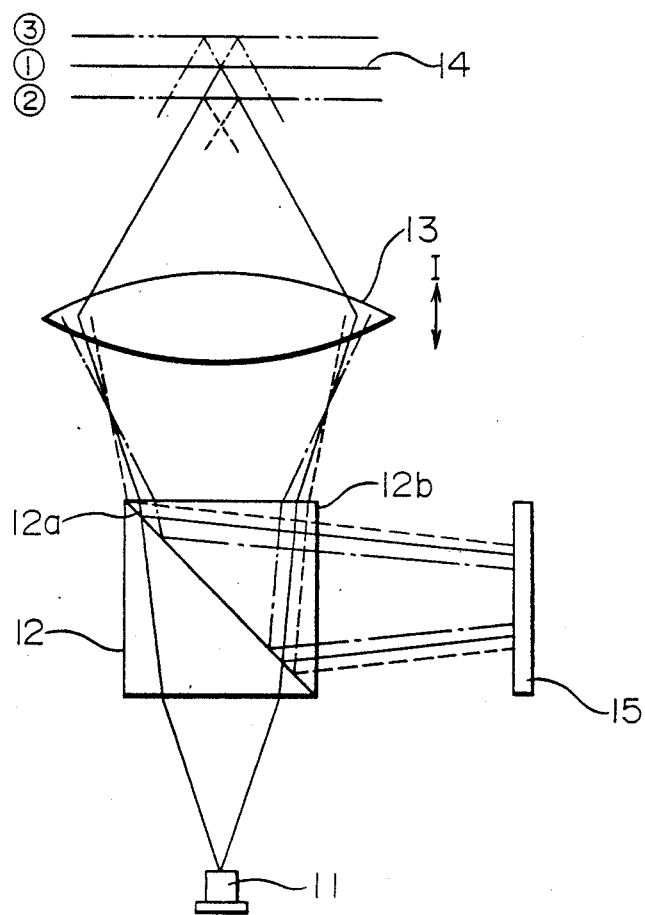
FIG. 10 schematically illustrates one example of a focal system on a conventional optical head.

Next using FIG. 6, the second preferred embodiment of the invention is hereunder described.

In FIG. 6, numeral 31 represents a laser diode serving as a light source; and 32, collimator lens that converts the beam from the laser diode 31 into a parallel beam; 33, beam splitter. The beam splitter 33 is formed, as indicated in FIG. 5, by bonding together three prisms of a common refractive index, and has a first optical splitting surface 33a and a second optical splitting surface 33b, each facing the laser diode 31 side. Numeral 34 represents an objective lens that converges and focuses the beam from the beam splitter 33 onto a recording medium 35. Numerals 36 and 37 are first and second two split photodetectors disposed as opposed to the surfaces $S_1$ and $S_2$ of the beam splitter 33, and to which the first and second independent beams, separated by the beam splitter 33, are respectively directed. The beam splitter 33 is disposed so that the incident boundary surface $S_0$ becomes virtually perpendicular to the incident beam (incident angle $\approx 0°$) once the object lens 34 attains optimum focal status, and that the exit beams slope to the exit boundary surfaces $S_1$ and $S_2$ (exit angle $>>0°$), thereby the incident angle is smaller than each exit angle.

According to such a constitution, a beam emitted from a laser diode 31 is focused on a recording medium 35, via a collimator lens 32, beam splitter 33, and objective lens 34. The beam fed back from the optical disk (recording medium) 35 is divided, by first and second optical splitting surfaces 33a and 33b of the beam splitter 33, correspondingly into a beam that is directed to a first two-split photodetector 36 and into another beam that is directed to a second two-split photodetector.

According to such a constitution, the beam splitter 33 serves as a beam splitter that splits a beam directed onto a recording medium 35, thereby the beam splitter 33 separates the fed-back beam into two independent beams, one toward the recording medium 35, and the other opposite to the recording medium 35. The resultant optical head is compact and light-weight, and an access time is positively decreased. A smaller number of parts allows a smaller number of steps in assembling process, hence a lower manufacturing cost. Furthermore, the beam splitter 33 eliminates an optical element (such as a half mirror) that separates a beam into one for tracking error detection and the other for focus error detection.

As previously described in the first preferred embodiment of the invention, the focusing sensitivity of the optical head of the invention is improved by disposing the beam splitter 33 so that the incident angle of the beam on the beam splitter 33 is smaller than the exit angle.

As can be understood from the description above, the invention is capable of providing an optical head that is characterized by easy adjustment of each optical element, higher focus detecting sensitivity, compactness and light weight, readily decreased access time, and low cost.

Figure 11:
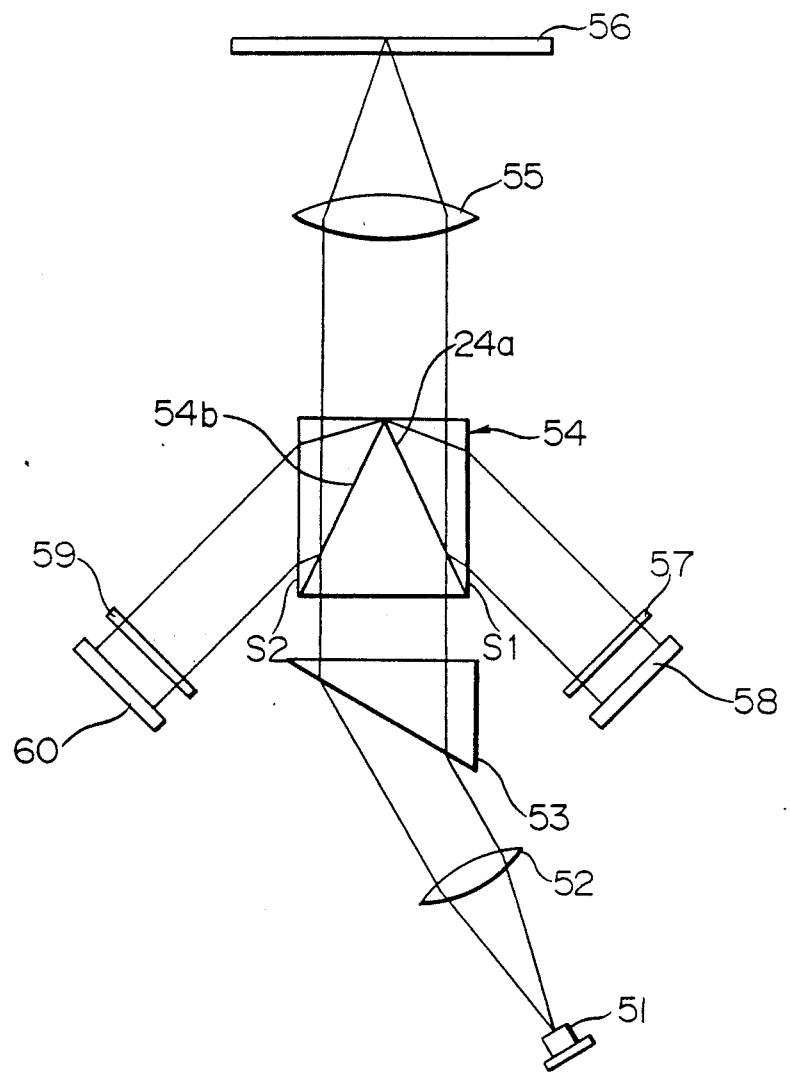
FIG. 11 schematically illustrates the third preferred embodiment according to the invention.
Figure 15:
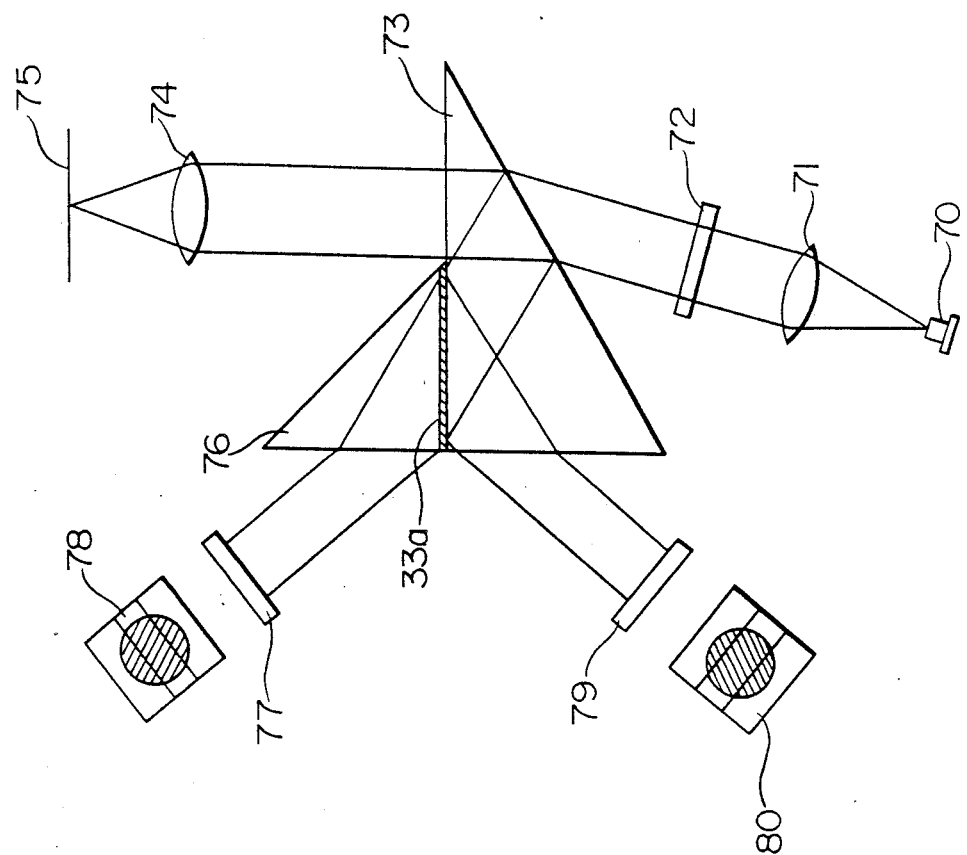
FIG. 15 schematically illustrates the fourth preferred embodiment of the invention.
Figure 16:
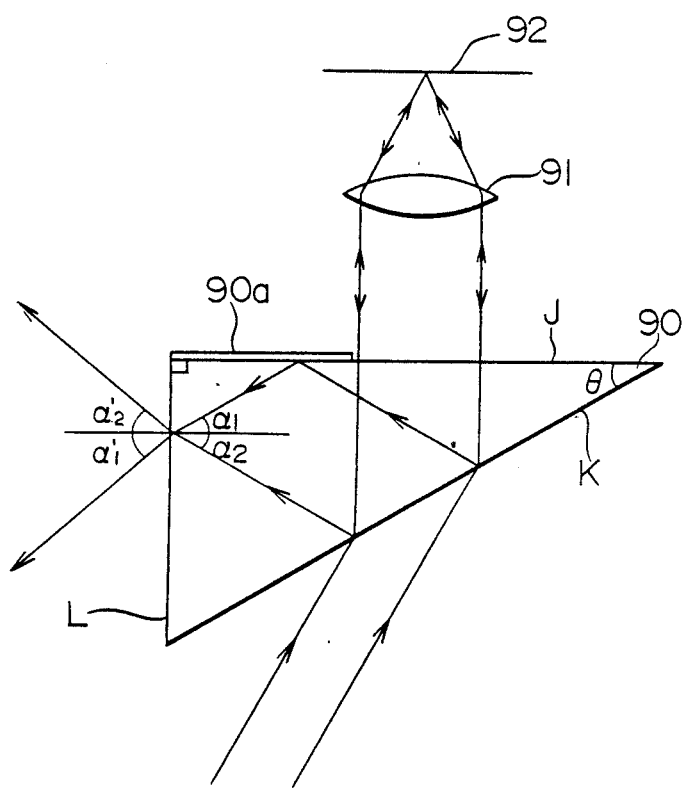
FIG. 16 schematically illustrates the fifth preferred embodiment of the invention.

The preferred embodiments according to the invention are hereunder described in detail by referring to drawings. FIG. 11 schematically illustrates the third preferred embodiment according to the invention. FIG. 12 illustrates light receiving element used on the system in FIG. 11. FIG. 13 describes the principle of optomagnetic recording performed on the system in FIG. 11. FIG. 14 illustrates transmittances of the S-polarized light component and R-polarized light component on the system in FIG. 11. FIG. 15 schematically illustrates the fourth preferred embodiment according to the invention. FIG. 16 schematically illustrates the fifth preferred embodiment according to the invention.

First, using FIG. 11, the third preferred embodiment according to the invention is hereunder described. This embodiment is an optical system for optomagnetic recording. In FIG. 11, numeral 51 represents a laser diode serving as a light source that emits a laser beam whose polarization direction being parallel to the plane of this figure; and 52, collimator lens that converts the beam from the laser diode 51 into a parallel beam; 53, anamorphic lens that forms a beam, emitted from the laser diode 51 and having an oval cross-section, into a beam of virtually circular cross-section. Numeral 54 represents a polarized light beam splitter comprising, to separate an incident beam into two independent beams, a first optical splitting surface 51a and second optical splitting surface 54b, wherein the exits angles, relative to the boundary surfaces S1 and S2 of the beam splitter 54, of the independent beams that are so separated by the optical splitting surfaces 54a and 54b are substantially equal to each other, and wherein the refractive indexes relative to air of the prism portions respectively having the boundary surfaces are virtually equal to each other. Numeral 55 represents an objective lens that focuses the parallel beam from the polarized light beam splitter 54 onto an optical disk 56 that serves as a recording medium. Numeral 57 represents a first polarized light element disposed to the boundary surface S1 side of the beam splitter 54; 58, a first two-split light receiving element disposed on an optical axis common to that of the first polarized light element 57. Numeral 59 represents a second polarized light element disposed to the boundary surface S2 side of the beam splitter 54 and being the polarization direction of which being perpendicular to that of the first polarized light element 57; 60, a second two-split light receiving element disposed on an optical axis common to that of the second polarized light element 59.

According to such a constitution, a beam emitted from a laser diode 51 is focused on an optical disk 56, via a collimator lens 52, anamorphic prism 53, polarized light beam splitter 54, and objective lens 55. The beam fed back from the optical disk 56 is divided, by first and second optical splitting surfaces 54a and 54b of the beam splitter 54, correspondingly into a beam that is directed to a first polarized light element 57 and into another beam that is directed to a second polarized light element 59. Therefore, one of the so-separated fed-back beam is directed to a first two-split light receiving element 58, and the other is directed to a second two-split light receiving element 60.

Next, referring to FIG. 12, the two-split light receiving elements 58 and 60 are described. As shown in FIG. 12(a), the light receiving element 58 has two discrete optical surfaces 58a and 48b. Similarly, as shown in FIG. 12(b), the light receiving element 60 has two discrete optical surfaces 60a and 60b.

Using FIG. 13, the data reproducing principle based on the optomagnetic recording technique is hereunder summarized. The optical disk 56 has binary data written thereon, wherein for example "1" information corresponds with the upward magnification, while "0" information corresponds with the downward magnification. In FIG. 13, I represents a polarized light direction of an incident polarized beam, i.e. a laser beam; R represents a polarized light direction of a reflected beam. The reflected polarized beam R is a beam whose polarized light direction is rotated, relative to that of the incident polarized beam, by $\theta_K$ (Kerr's angle of rotation), in the vertical direction relative to the plane of this figure, $\theta_K$ can be either a negative or positive value depending on the direction of magnification. Therefore, by disposing the polarized light element 57 (or 59) as tilted by angle $\theta$ from the optical quenching angle of an incident polarized beam, the resultant beam directed to the two-split light receiving element 58 (or 60) can be either A or B as shown by arrows in FIG. 13, thereby change in beam intensity occurs.

Accordingly, the tracking error signal, focusing error signal, and information reproducing signal are defined based on the outputs S through V available on the discrete surfaces of the light receiving elements 58 and 60.

Tracking error signal: $(S+T)-(U+V)$
Focusing error signal: $(T+V)-(S+U)$
Information reproducing signal: $(S+T)-(U+V)$.

According to this preferred embodiment, a particular detecting technique is applicable commonly to both the tracking error signal and information reproducing signal. However, the frequency band area of the tracking error signal is more than two digits lower than that of the information reproducing signal, thereby both signals can be differentiated with each other by transmitting them via a filtering circuit.

The above-mentioned constitution allows the following effect.

According to this preferred embodiment, when a beam reflected by the optical disk 56 exits from the polarized beam light splitter 54, a specific portion of the p-polarized light component (parallel to the plane of this figure) is reflected by the surface S1, while a specific portion of the S-polarized light component (vertical to the plane of this figure) is reflected by the surface S2, wherein the portions are reflected in ratios different with each other.

Transmittances $T_S$ and $T_T$ respectively of the S-polarized light component and P-polarized light component are defined by the following expressions.

$$T_S = 1 - R_S^2 \qquad (14)$$

$$T_T = 1 - R_T^2 \qquad (15)$$

where:
$R_S = (n_1 \cos\theta_1 - n_2 \cos\theta_2)/(n_1 \cos\theta_1 + n_2 \cos\theta_2)$
$R_T = (n_2 \cos\theta_1 - n_2 \cos\theta_2)/(n_2 \cos\theta_1 + n_1 \cos\theta_2)$.
$\theta_1$ and $\theta_2$ are defined as follows.

$$\sin\theta_2/\sin\theta_1 = n_1/n_2$$

when graphically plotting the results of expressions (14) and (15), the resultant data will be as in FIG. 14.

Accordingly, when $u_1 \neq u_2$, the tangent line inclinations at $u_1$ and $u_2$ on $T_t$ are different with each other. This fact is also valid with $T_S$.

Correspondingly, if u varies by u as a result of defocusing, and when $u_1 \neq u_2$, changes in intensity of beams respectively exiting from the beam splitter 54 into air are different with each other. Since incorporating $\theta_K$ (Kerr's angle of rotation) component, $T_S$ exerts greater influence on the information reproducing signal, and thus possibly causing the S/N ratio to deteriorate.

According to this embodiment, the exit angles, relative to the surfaces S1 and S2, of the optical axes of two independent beams respectively from the two optical splitting surfaces 54a and 54b of the polarized light beam splitter 54 are virtually identical with each other. At the same time, the refractive indexes relative to air of prisms respectively having boundary surfaces S1 and S2 are virtually identical with each other. Accordingly, even when incident angles change due to defocusing, the transmittances of both prisms do not differ with each other, thereby the focusing error signal, tracking error signal, and information reproducing signal do not involve focus offset.

Therefore, the focusing error signal, tracking error signal, and information reproducing signal, each obtained based on the outputs of two light receiving elements 58 and 60, can be accurate and reliable signals.

Next, the fourth preferred embodiment according to the invention is described referring to FIG. 15. This embodiment is another example of an optical system associated with optomagnetic recording/reproducing operation, and differs from the third embodiment.

In this figure, numeral 70 represents a laser diode serving as a light source; 71, collimator lens that converts a laser beam emitted from the laser diode 71 into a parallel beam; and 72, half-wave plate that controls the polarization plane of the laser beam emitted from the laser diode 70. Numeral 73 represents a polarized light beam splitter having a polarizing filter 73a; and 74, objective lens that focuses the parallel beam from the collimator lens 71 onto a recording medium 75. The polarizing filter 73a is such that it allows the P-polarized beam to pass and reflects the S-polarized beam. Numeral 76 represents an addition prism disposed on the polarizing filter 73a of the polarized light beam splitter 73; 77, first polarized light element; 78, first three-split light receiving element; 79, second light receiving element; and 80, second three-split light receiving element.

According to this embodiment, two independent beams (P-polarized light component, and S-polarized light component) so separated by the polarizing filter 73a exit respectively from the polarized light beam splitter 73 and the addition prism 76, wherein the exit angles of these beams are virtually identical with each other, and the optical refractive indexes relative to air respectively of the polarized light beam splitter 73 and the addition prism 76 are virtually identical with each other.

Similarly to the previously described third embodiment of the invention, according to this constitution too, the transmittances of both independent beams, even when incident angles vary due to defocusing, remain identical with each other, thereby the focusing error signal, tracking error signal, and information reproducing signal do not involve focus offset.

Therefore, the focusing error signal, tracking error signal, and information reproducing signal, each obtained based on the outputs of the light receiving elements are accurate and reliable signals.

The fifth preferred embodiment according to the invention is hereunder described referring to FIG. 16. Numeral 90 represents a triangle prism whose apex angle is $\theta$, wherein a surface J is perpendicular to a surface L, and the surface J has a reflective-coated region 90a. Numeral 91 represents an objective lens; and 92, recording medium. The triangle prism 90 is positioned so that the laser beam entering a surface K exits from the surface J vertically.

According to such a constitution, a laser beam emitted from an unshown laser diode enters the triangle prism 90 via the surface K, and exits vertically from an area on the surface J other than the coated region 90a, and is focused onto the recording medium 92 by the objective lens 91. The beam fed back from the recording medium 92 is converted into a parallel beam by the objective lens 91, and is directed vertically to the non-coated region in the surface J of the triangle prism 90. The so-entered beam is reflected by the surface K, wherein a portion of the beam exits from the surface L, while the other, being totally reflected from the coated region 90a in the surface J, exits from the surface L.

According to the above constitution, incident angles $\alpha_1$ and $\alpha_2$, relative to the surface L, of the two independent beams divided within the triangle 90 are constantly identical with each other. Accordingly, the resultant exit angles $\alpha_1'$ and $\alpha_2'$ are identical with each other. Thus the transmittances of both independent beams, even when incident angles vary due to defocusing, remain identical with each other, thereby the focusing error signal, tracking error signal, and information reproducing signal do not involve focus offset.

Therefore, the focusing error signal, tracking error signal, and information reproducing signal, each obtained based on the outputs of the light receiving elements are accurate and reliable signals. Such a prism 90 allows easier designing and manufacturing.

The above embodiment does not necessarily require the coated region 90a. If incident angle > critical angle, total reflection occurs, and the coated area 90a is not necessary.

As can be understood from the description above, the present invention is capable of providing an optical head that does not incur deterioration in a signal reproduction S/N ratio that is otherwise inevitable in the case of defocusing.

Next, the present invention described in further detail, by referring to FIG. 19 that illustrates one example of a prior art optical head, and, also by referring to FIGS. 17 and 18 that illustrate one preferred embodiment according to the invention.

Figure 20:
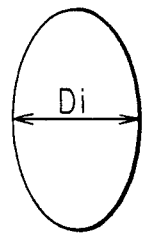
FIG. 20 is a cross-section of a beam being emitted from a laser diode in FIG. 19, taken on the line X—X.

One example of a conventional optical head is illustrated in FIG. 19, where numeral 101 represents a laser diode that emits a laser beam. The laser beam emitted from the laser diode 101 is a linearly polarized beam, and the laser diode 101 is disposed so that the orientation of the wave front of the linearly polarized component is parallel to the incident surface of the slope 104a of a polarized beam splitter 104 described later. In this example, the cross-section of the laser beam is, as shown in FIG. 20, an oval shape whose radius is smaller along a radius of a recording medium 107 described later. Numeral 102 represents a collimator lens that converts the beam from the laser diode 101 into a parallel beam; 103, prism (anamorphic prism) that modifies the beam of an oval cross-section emitted from the laser diode 101 into a beam of a virtually circular cross-section. Numeral 104 represents a polarized beam splitter that passes a component (P component) parallel to the incident surface of slope 104a reflects, by the slope 104a, a component (S component) perpendicular to the incident surface. Numeral 105 represents a quarter-wave plate that has a particularly designed thickness so that there occurs a quarter wave long difference in optical paths of mutually perpendicular linearly polarized components. Numeral 106 represents an objective lens that focuses a beam from the quarter-wave plate 106 onto the recording medium 107. Numeral 108 represents a drive system that shifts the objective lens 106 in the arrow I direction during a focusing operation, and in the arrow II direction during a tracking operation.

Numeral 109 represents a light receiving lens that receives and converges the beam from the polarized beam splitter 104; 110, beam splitter that diverts a portion of the beam from the light receiving lens 109 toward the collimator lens 102 side; and 111, two-split photodetector for tracking error detection, that once receiving a portion of beam diverted by the beam splitter 110 generates an electrical signal. Numeral 112 represents a cylindrical lens that receives another portion of beam from the beam splitter 110, and that functions as a lens only in the longitudinal direction in this figure; 113, four-split photodetector for focus error detection, that receives the beam from the cylindrical lens 112 and generates an electrical signal. Components 109 through 113 are categorized into a photodetection system. Additionally, for traveling to a reading position, the optical head as one entity (encircled by two-dot chain lines) shifts in the arrow III direction.

Figure 21:
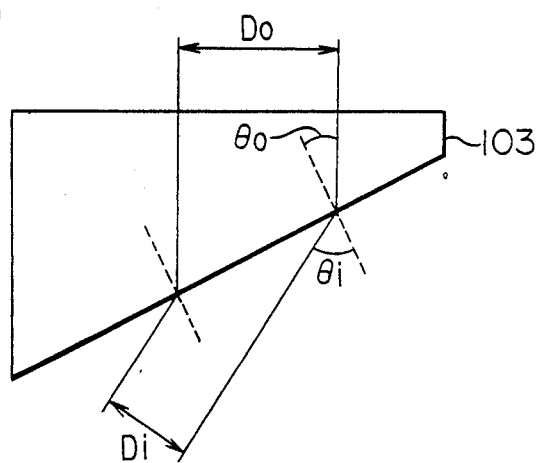
FIG. 21 illustrates a prism in the system of FIG. 19.
Figure 22:
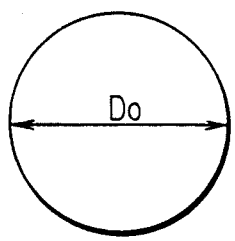
FIG. 22 is a cross-section of a beam exiting from a prism in FIG. 19, taken on the line Y—Y.

According to such a constitution, the linearly polarized beam emitted from the laser diode 101 is converted into a parallel beam by the collimator lens 102, and enters the prism 103. When the diameter (smallest diameter), along a radius of the recording medium 107, of the laser beam of virtually oval cross-section entering the prism 103 is $D_i$, incident angle is $\theta_i$, refraction angle is $\theta_o$, and the diameter, along a radius of the recording medium 107, of the laser beam exiting from the prism is $D_o$, the following correlation between $D_i$ and $D_o$ is valid, thereby the ellipticity is improved (refer to FIGS. 20 through 22).

$$D_0 = D_i (\cos \theta_o / \cos \theta_i) \quad (1)$$

The laser beam exited from the prism 103 enters the polarized beam splitter 104. Since the wave front of the linearly polarized component is parallel to the exit surface of the slope 104a on the polarized beam splitter 104 (P-polarized light component), the beam passes through the slope 104a on the polarized beam splitter 104 and enters the quarter-wave plate 105, and where the beam incorporates 90° phase difference, thereby the beam is changed from the linearly polarized beam to a circularly polarized beam. The resultant circularly polarized beam is converged by the objective lens 106 and is focused onto the recording medium 107. The beam fed back from the recording medium 107 again incorporates 90° phase difference as passing through the quarter-wave plate 105, and is changed from the circularly polarized beam to a linearly polarized beam. The resultant linearly polarized beam is a linearly polarized beam (S-polarized beam) whose phase is 180° different from that of the linearly polarized beam (P-polarized beam) from the laser diode 101. In other words, the resultant linearly polarized beam is perpendicular to the latter linearly polarized beam. The resultant linearly polarized beam enters the polarized beam splitter 104, and is reflected by the slope 104a, and converged by the light receiving lens 109. The beam converged by the light receiving lens 109 enters the beam splitter 110 and is separated into two independent beams of independent orientations. One independent beam is focused onto the two-split photodetector 111 for tracking error detection. The other independent beam is focused onto the four-split photodetector 113 for focusing error detection via the cylindrical lens 112.

One example of a beam spot formed on the two-split photodetector 111 for tracking error detection is shown in FIG. 18(b), and one example of a beam spot formed on the four-split photodetector 113 for focusing error detection is shown in FIG. 18(c). Based on outputs A through F available on the respective discrete surfaces of the photodetectors 111 and 113, the tracking error signal, focusing error signal, and information reproducing signal are defined as follows.

Tracking error signal: A−B
Focusing error signal: (C+F)−(D+F)
Information reproducing signal: A+B.

The above-mentioned tracking error detection technique is called the push-pull method; and the focusing error detection technique is called the astigmatic method.

The optical head of the above constitution comprises two optical elements, one being the prism 103 improves the ellipticity of the beam, and the other being the polarized beam splitter 104 that separates the beam fed back from the recording medium into independent beams. These optical elements are expensive and occupy larger spaces, and the resultant optical head disadvantageously tends to be larger. Additionally, such an optical head is heavier, and disadvantageously inhibits reduction in access time, and, furthermore, such an optical head requires a larger number of manufacturing steps.

The present invention is intended to solve the above problems. Therefore, one object of the invention is to provide a low-cost, compact, light-weight, optical head capable of readily decreasing access time, wherein the optical head is capable of reducing manufacturing steps. Another object of the invention is to provide an optical head that is less subject to tracking offset.

To solve these problems, the present invention provides an optical head on which a beam from a laser light source is focused onto a recording medium by an objective lens, and on which at least focusing and tracking are performed based on detection of the fed-back beam from the recording medium; wherein the optical head is provided with a prism comprising a first surface facing the objective lens and perpendicular to the optical axis of the objective lens, a second surface facing the last light source and sloping to the first surface, and a third surface, and the edge line formed between the first and third surfaces is parallel to the tracking direction; and wherein the beam, which is emitted from the laser light source and enters the second surface of the prism and exits from the first surface, is modified and becomes parallel to the optical axis of the objective lens, and, at the same time, the fed-back beam from the recording medium is reflected by the second surface and is separated from an incident beam and is split into two independent beams by the edge line.

In the optical head of the invention, the beam from the laser light source enters the second surface of the prism and exits from the first surface wherein the prism comprises the first surface facing the objective lens and perpendicular to the optical axis of the objective lens, the second surface facing the last light source and sloping to the first surface, and the third surface, and the edge line formed between the first and third surfaces is parallel to the tracking direction. During this course, the beam emitted from the laser light source is modified and becomes parallel to the optical axis of the objective lens, while the fed-back beam from the recording medium is reflected by the second surface and is separated from an incident beam and is split into two independent beams by the edge line.

Next, referring to FIGS 17 and 18, one preferred embodiment according to the invention is described. In this embodiment, like parts identical with those in the prior art in FIG. 19 are given like numbers and are not described here.

The embodiment differs from the prior art in FIG. 19 in that on an optical head in this embodiment, an objective lens 106 shifts in the arrow I direction in FIGS. 16 and 17 during a focusing operation, and the objective lens 106 shifts in a direction vertical to the planes of these figures in the course of a tracking operation.

In this embodiment, a prism 120 of apex angle $\theta$ is disposed between an objective lens 106 and a collimator lens 102, instead of the polarized beam splitter 104 and the square-wave plate 105 in FIG. 18. This prism 120 comprises a surface G that faces the objective lens 106 and is perpendicular to the optical axis of the objective lens 106, a surface H that faces a laser diode 101 and slopes to the surface G, and I that is perpendicular to the surface G and connects the surfaces G and H. The surface H has coating that reflects a portion of an incident beam emitted from the objective lens 106. The prism 120 is disposed so that an edge line E formed between the surface G and surface I is parallel to the tracking direction, and so that the optical axis of the beam reflected from the surface H corresponds with the edge line E formed between the surface G and surface H. The laser diode 101 is disposed, and, at the same time, a refractive index n of the prism is determined so that the laser beam from the collimator lens 102 takes an incident angle $\phi$, refraction angle $\theta$, relative to the surface H.

To one side of the prism are disposed two-split photodetectors 121 and 122.

Next, the operation of the above-mentioned constitution is hereunder described. The laser beam from the collimator lens 102 enters the surface H on the prism 120 at an incident angle $\theta$, thereby a diameter of the beam in a radius direction of the recording medium 107 is enlarged $\cos\theta/\cos\phi$ times to improve ellipticity. Then the beam exits from the surface G virtually vertically and is converged by the objective lens 106 and is focused onto the recording medium 107. The beam fed back from the recording medium 107 is converted into a parallel beam, and the parallel beam enters the surface G virtually vertically, and is reflected by the surface H. The optical axis of the reflected beam corresponds with the edge line E formed between the surface G and surface I. Accordingly the beam is split along the optical axis into two independent beams, thereby one independent beam is reflected by the surface G and passes through the surface I, and travels opposite to the recording medium 107 and is focused onto a four split photodetector 121.

One example of a beam spot formed on the four split photodetector 121 is shown in FIG. 17(b); and one example of a beam spot formed on the four split photodetector 122 is shown in FIG. 17(c). The areas highlighted with oblique lines on both photodetectors indicate the distribution of the primary diffraction beam based on a track on the optical disk. Based on outputs A through H available on the respective discrete surfaces of the photodetectors 121 and 122, the tracking error signal, and focusing error signal are defined as follows.

Tracking error signal: (A+B+E+F)−(C+D+G+H)

Focusing error signal: (B+C+F+G)−(A+D+E+H).

According to the above-mentioned constitution, the prism 120 serves as a formed prism and, at the same time, as a beam splitter that separates a beam into a beam directed to the recording medium and a beam reflected from the recording medium 107, thereby the resultant optical head can be compact and light-weight, and an access time can be readily decreased. A smaller number of parts allows a smaller number of steps in assembling process, hence a lower manufacturing cost. Furthermore, the prism 120 separates the fed-back beam exiting from the surface C into two independent beams, one toward the recording medium 107, and the other opposite to the recording medium 107. Therefore, a resultant photodetection system can eliminate an optical element (for example, the beam splitter 110, in FIG. 19 that illustrates a prior art) that separates a beam into one for tracking error detection and the other for focus error detection.

Next, a case where the edge line E is not parallel to the tracking direction (perpendicular to the plane of this figure) is described referring to FIG. 18.

In FIG. 18, an objective lens 106 travels in the arrow II direction in the course of a tracking operation. In this figure, solid lines indicate a case where the optical axis of the beam reflected from the surface H corresponds with the edge line E formed between the surface G and surface H. Under this condition, when the objective lens 106 to the right relative to this figure, for tracking adjustment, the edge line E as a result unevenly splits the reflected beam, and, in the case of this embodiment, a proportion of reflected beam directed to the four split photodetector 122 side is greater (as indicated by dashed lines respectively on the four split photodetectors 121 and 122). Consequently, even if the focusing status of the objective lens 106 remains unchanged, a focusing error signal may vary as a result of tracking in the arrow II direction, thus possibly resulting in irregularity in the focusing status.

According to this embodiment, however, the edge line E and the tracking direction (perpendicular to the plane of this figure) are parallel with each other, thereby the reflected beam is always evenly split by the edge line E regardless of a tracking operation. Accordingly, the resultant optical head of the invention is an optical head which does not incur errors in the focusing signal. In other words, the optical head of the invention is one whose focus being least subject to tracking error.

Additionally, the scope of the invention is not limited only to these preferred embodiments. In these embodiments, the description was based on optical heads for reproducing information. However, it should be understood that the invention can be also applicable to optical head that are capable of recording and erasing information.

As can be understood from the description above, the present invention positively provides a compact, light-weight optical head that readily allows a decreased access time, reduces a number of assembling steps for manufacturing, and is least subject to tracking offset.

What is claimed is:

1. A method for detecting a focal point by the use of an optical system comprising,
    (a) a light source for emitting a luminous flux to irradiate a recording medium;
    (b) a prism including a first surface into which said luminous flux emanating from said recording medium enters, said first surface being substantially perpendicular to said luminous flux emanating from said recording medium, a second surface which is inclined relative to said first surface for reflecting luminous flux traversing said first surface, and a third surface, joining said first surface and said second surface, through which said luminous flux passes;
    (c) an objective lens provided between said prism and said recording medium;
    (d) a photodetector for detecting the intensity of the light flux emanating from said recording medium, through said objective lens, and through said third surface of said prism, and converting the intensity of the light flux to an electric signal; and
    (e) lens driving means attached to said objective lens and capable of moving said objective lens in a direction perpendicular to the surface of said recording medium in response to said electric signal;
    said method comprising the steps of:
        placing said prism so that the incident angle of said luminous flux emanating from said recording medium through said objective lens is smaller than the emergent angle of said flux from said prism to said photodetector;
        detecting said intensity of the light flux emerged from said third surface of said prism by said photodetector to convert into an electric signal; and operating said lens driving means to adjust the distance between said recording medium and said objective lens in response to said electrical signal.

2. The method of claim 1, said third surface includes a light-reflective coating.

3. The method of claim 1, said second surface includes a nonreflective coating.

4. The method of claim 1, wherein said light source includes a laser diode.

5. The method of claim 1, wherein said recording medium includes a reflective surface and said light source is disposed on the same side of said prism relative to said recording medium.

6. The method of claim 1, wherein said recording medium includes a reflective surface.

7. The method of claim 9, wherein said light source includes a laser diode.

8. The method of claim 1, wherein said prism splits said luminous flux into a first split luminous flux and a second split luminous flux.

9. The method of claim 8, wherein a first photodetector detects said first split luminous flux and a second photodetector detects said second split luminous flux.

10. The method of claim 9, wherein said first and second photodetectors are disposed on one side of said prism.

11. The method of claim 10, wherein said first and second photodetectors are disposed on both sides of said prism.

12. The method of claim 10 or 11, wherein said each of said first and second photodetectors is divided into more than two parts and each divided part generates an electric signal in response to luminous flux incident thereon.

13. The method of claim 1, wherein said third surface includes a reflective portion.

14. The method of claim 1, wherein a quarter-wave plate is disposed between said objective lens and said prism, and said third surface includes a polarized film.

15. An optical head for focusing a light beam emanating from a light source onto a recording medium and determining a focus condition of the optical head by detecting the returning light beam from the recording medium by detection means, comprising:

an objective lens for focusing the light beam emanating from the light source onto the recording medium; and a prism disposed between said light source and said objective lens, said prism including a first surface facing said objective lens and a second external surface facing said light source, said second surface being inclined relative to said first surface, said prism passing the light beam emanating from the light source therethrough from the second surface to the first surface, introducing the returning light beam therein through the first surface, reflecting the introduced returning light beam on the second surface so as to separate the returning light beam from the light beam emanating from the light source, and projecting the reflected returning light beam therefrom onto the detection means.

16. The optical head of claim 15, wherein an incident angle of the returning light beam to said prism is made smaller than an exit angle of the returning light beam from said prism.

17. The optical head of claim 15, wherein said prism further includes a split means for splitting the reflected returning light beam into two light beams.

18. The optical head of claim 17, wherein said two light beams are adapted to exit from said prisms with the substantially same exit angles.

19. The optical head of claim 17, wherein said prism further includes a third surface joining the first surface and the second surface whereby an edge line formed between the first surface and the third surface is used as said split means.

20. The optical head of claim 19, wherein the first surface reflects the split returning light beam so as to project it from the third surface.

21. The optical head of claim 19, wherein a part of the first surface forming the edge line includes a reflective coating to reflect the split returning light beam so as to project it from the third surface.

22. The optical head of claim 17, wherein said split means is a polarizing means for splitting the reflected returning light beam into two polarized light beams.

23. The optical head of claim 22, wherein said polarizing means is a polarizing filter.

24. The optical head of claim 22, wherein said polarizing means is disposed on a portion of the first surface.

25. The optical head of claim 15, further including a first collimating lens disposed between said prism and said recording medium for substantially collimating light reflected by said recording medium and a second collimating lens disposed between said light source and said prism for substantially collimating light emanating from said light source.

26. The optical head of claim 25, further including lens driving means attached to said first collimating lens and capable of moving said first collimating lens in a direction perpendicular to the surface of said recording medium in response to said position signal.

27. The optical head of claim 15, wherein the incident angle of said light reflected by said recording medium and passing through said first collimating lens is smaller than the emergent angle of said flux from said prism to said photodetector.

28. The optical head of claim 15, wherein said light source includes a laser diode.

29. The optical head of claim 15 wherein said prism splits said light into a first light beam and a second light beam.

30. The optical head of claim 29, wherein a first photodetector detects said first light beam and a second photodetector detects said second light beam.

31. The optical head of claim 29, wherein said first and second photodetectors are disposed on one side of said prism.

32. The optical head of claim 29, wherein said first and second photodetectors are disposed on opposite sides of said prism.

33. The optical head of claim 29, wherein each of said first and second photodetectors is divided into more than two parts and each divided part generates an electric signal in response to light incident thereon.

34. The optical head of claim 15, wherein a quarter-wave plate is disposed between said objective lens and said prism, and said third surface includes a polarized film.

* * * * *